F. B. SAEGMÜLLER.
TELESCOPE.
APPLICATION FILED AUG. 28, 1911.
1,012,715.
Patented Dec. 26, 1911.
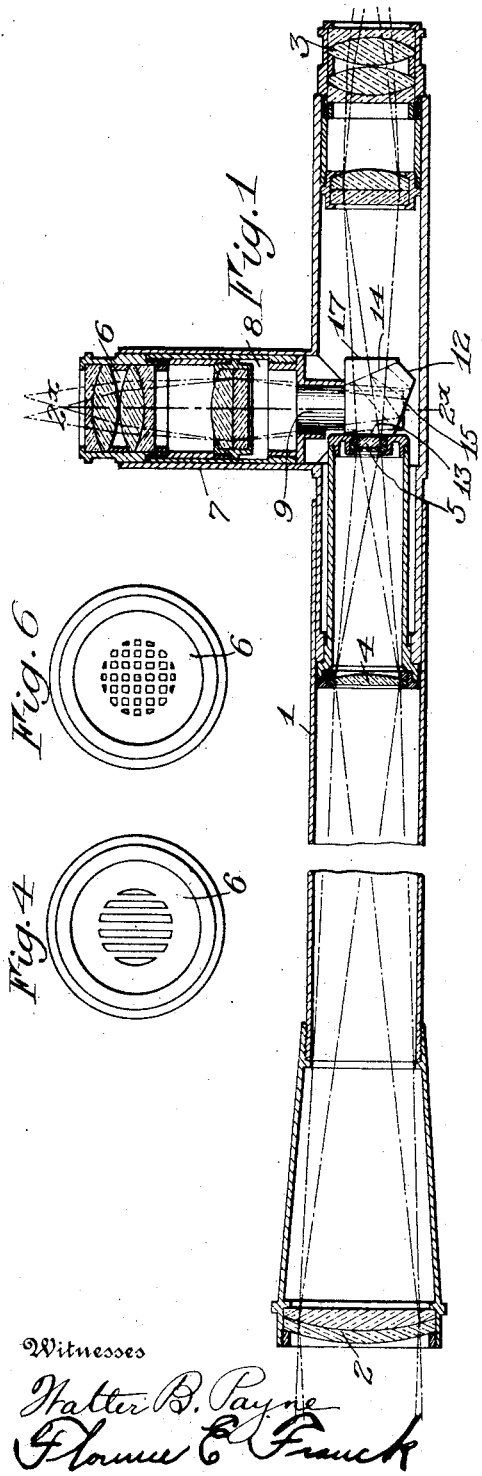
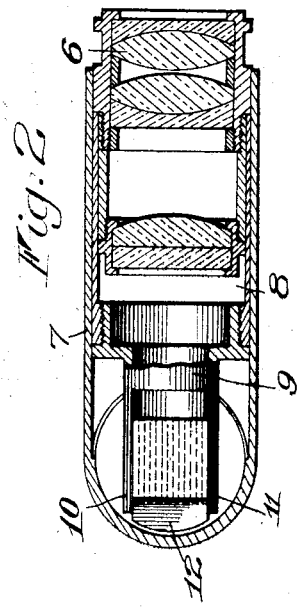
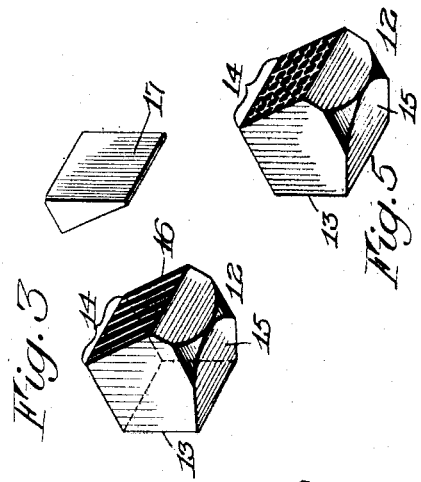
Inventor
Frederick B. Saegmüller

UNITED STATES PATENT OFFICE.

FREDERICK B. SAEGMÜLLER, OF ROCHESTER, NEW YORK. ASSIGNOR TO BAUSCH & LOMB OPTICAL COMPANY, OF ROCHESTER, NEW YORK, A CORPORATION OF NEW YORK.

TELESCOPE.

1,012,715.   Specification of Letters Patent.   Patented Dec. 26, 1911.

Application filed August 28, 1911. Serial No. 646,328.

*To all whom it may concern:*

Be it known that I, FREDERICK B. SAEGMÜLLER, of Rochester, in the county of Monroe and State of New York, have invented certain new and useful Improvements in Telescopes; and I do hereby declare the following to be a full, clear, and exact description of the same, reference being had to the accompanying drawings, forming a part of this specification, and to the reference-numerals marked thereon.

My present invention relates to telescopes, particularly of that type adapted to be used for the sighting of cannon, and it has for its object to provide an instrument of this character in which two persons, such as the gunner, or the ordnance officer or instructor, may simultaneously view the same object by observing two different images of the object appearing in two separate eye-pieces, or oculars, and in carrying out my invention, I provide in an instrument of this character means for properly positioning the image of the object by reflecting or directing only a portion of the light rays into the secondary, or officer's, eye-piece, permitting the remaining portion of said rays to pass into and portray a clear view of the object in the primary, or gunner's, eye-piece.

To these and other ends the invention consists in certain improvements and combinations of parts all as will be hereinafter more fully described, the novel features being pointed out in the claims at the end of the specification.

In the drawings: Figure 1 is a horizontal sectional view of a telescope illustrating one embodiment of my invention; Fig. 2 is an enlarged sectional view taken on the line 2<sup>x</sup>—2<sup>x</sup> of Fig. 1; Fig. 3 is an enlarged perspective view showing a prism which may be employed as one means for accomplishing the object of my invention; Fig. 4 is an illustration showing an enlarged outline of the exit pupil of one of the eye-pieces, formed by the prism shown in Fig. 3, as it appears when viewed at a distance therefrom; Fig. 5 is a view similar to Fig. 3, showing another way in which the reflecting surface of the prism may be made; and Fig. 6 is a view illustrating the appearance of the exit pupil formed by a reflecting surface such as shown in Fig. 5.

Similar reference numerals throughout the several figures indicate the same parts.

In illustrating my present invention I have shown it in connection with a telescope comprising the tubular shell 1 to the outer end of which is fitted an objective lens 2, and having at its opposite end the primary eye-piece, or ocular, 3, containing any preferred arrangement of eye-piece lenses in relation to which the usual cross-hairs are located, as will be understood. In an instrument of this character when it is intended to be used as a gun sight, it is important that the images of objects viewed by the operator appear in their normal upright positions, and there is therefore interposed between the objective and eye-piece a system of erecting lenses comprising a collective lens 4 and the projecting lens 5. A secondary ocular, indicated by 6, intended for the use of the officer or instructor, comprises an independent system of eye-piece lenses, the axis of which extends at an angle to the major axis of the telescope. This secondary ocular is supported in the tube 7 surrounding an aperture in the side wall of the shell 1, the lenses being supported in a suitable mounting 8, at the inner end of which is a tubular extension 9 having spaced arms 10 and 11 projecting across the shell 1. These arms are preferably employed as the support on which is mounted the means employed for collecting a portion of the rays of light passing through the body of the instrument and reflecting them into the secondary ocular. The latter is preferably arranged with the axis of its lenses at right angles to the main axis of the telescope in rear of the erecting system of lenses 4 and 5, and as all of the rays of light emanating from all points of the field covered by the objective lens 2 pass through all points of the exposed portion of the lens 5, it is possible at this point to deflect a portion of the pencil of rays into the secondary ocular, and permit the remaining rays of the pencil to pass into the primary ocular, and still produce in each ocular a complete image of the object. In order, however, to prevent the reversal from right to left, it is desirable that the rays of light be bent by employing coacting reflecting surfaces, and for this reason I prefer to employ a pentagonal prism 12 which may be rigidly supported between the arms 10 and 11. This prism is arranged with its entrant surface 13 in proximity to the lens 5, and its coacting reflecting surfaces 14 and 15 are positioned relatively to each other so that the former receiving the light rays will reflect them onto the latter surface, which will direct them into the secondary ocular 6. Now, in order to obtain in the eye-pieces exit pupils in each of which the whole image of the object covered by the objective lens is portrayed with equal distinctness, and may be viewed by the observer placing his eye centrally of the eye-piece in axial alinement with the exit pupil instead of eccentrically or to one side thereof, I make the prism 12 of sufficient width to cover the lens 5 and receive the entire pencil of rays traversing the axis of the telescope, and make provision whereby the reflected rays are selected from various points in the cross section of the pencil while those which are not selected for reflection are permitted to pass on and into the primary ocular. This selection of the rays is accomplished in the present instance by covering spots or points of the reflecting surface and distributing these over said surface in such a way that approximately one-half of the total area of the surface remains clear and unobstructed to permit the passage of light rays therethrough. The covering or spotting is preferably formed by a coating of plating or silvering on the surface 14 applied either in the form of bands as indicated by 16 in Fig. 3, or by spotting the surface as indicated in Fig. 5. The precise arrangement of the bands or spots is not essential so long as they are so proportioned and placed that about one-half of the total rays will be reflected from points distributed throughout the whole cross sectional area of the pencil as distinguished from being all taken from one side or the center of the pencil. These bands, or spots, increase the reflective power of these points of the surface 14 which they overlie, while the intervening transparent portions permit the emergence of the light rays permitting these to pass on to the primary ocular. The surface 15 is preferably silvered completely but it may be left uncoated.

In conjunction with the prism 12 I employ another prism 17 which is preferably cemented with one of its surfaces in contact with surface 14, said prism 17 being so shaped that the rays of light passing thereinto from the unobstructed portions of the surface 14 will continue in the true axis of the telescope and will also be corrected to prevent chromatic aberration. The silvering of portions of the surface 14 of the prism 12 in the manner illustrated, and employing with said prism the secondary prism 17, produces the same result as would be accomplished should a plurality of very narrow prisms be employed and arranged with air spaces between them through which a portion of the rays of light could pass unobstructedly to the primary ocular, but from a practical standpoint such an equivalent arrangement of prisms possesses many disadvantages, particularly on account of the necessary delicacy of the parts and the difficulty of rigidly supporting them in accurate position, besides the fact of cutting off an undue amount of light rays.

A material advantage is obtained by intercepting the entire pencil of rays and selecting from across the entire width of the pencil portions which are sufficient to accurately portray the image in the secondary ocular, and likewise leaving an equal portion of rays from different portions of the entire pencil which will pass uninterruptedly into the primary ocular, since then in both oculars the exit pupil will be circular in outline, a correct view of the image formed which may be viewed by the observer placing his eye in direct axial alinement with either of the eye-pieces. The silvered portions of the prism 12 should be only of such a width that the images of them appearing in the eye point will be covered, or spanned, by the pupil of the observer's eye, so that he will, in effect, look through or between said images and observe the image of the object itself beyond said images of the silvered portion. The latter are only visible when one's eye is withdrawn sufficiently from the eye point to observe the exit pupil instead of the image focused at the eye point.

I claim as my invention:

1. The combination with a telescope comprising an objective lens and two ocular lenses, of a prism arranged to intercept the entire pencil of rays from the objective lens having a plurality of spaced reflecting surfaces receiving and directing a portion of the rays into one of the oculars, the portion of the prism between said surfaces permitting the direct passage of the remaining rays to the other ocular.

2. The combination with a telescope lens system comprising objective and eye-piece lenses, of a secondary eye-piece lens located with its axis at an angle to the axis of the lens system, a prism located in the axis of the lens system and having two coacting surfaces, one of which is provided with alternately spaced clear and reflecting portions, said portions serving to permit part of the rays to traverse the axis of the telescope and to direct part of said rays into the secondary eye-piece.

3. A telescope comprising an objective lens, a primary ocular lens system arranged behind it and a secondary ocular lens system located at one side of the axis of the objective lens in proximity to the primary ocular, a prism having coacting reflecting surfaces for directing rays of light from the objective into the secondary ocular one of said surfaces being partly silvered and partly plain, the unsilvered part permitting a portion of said rays of light to pass into the primary ocular.

4. The combination with a telescope comprising an objective lens and two separate eye-piece lenses, of means for reflecting a portion of the rays from the objective lens into one of the eye-piece lenses comprising a reflecting surface composed of a plurality of separated reflecting spots interposed in the pencil of rays.

5. The combination with a telescope comprising an objective lens and two separate eye-piece lenses, of means for forming images at both eye-pieces comprising a transparent surface arranged across the pencil of rays passing from the objective lens having a plurality of spaced reflecting spots intercepting and directing portions from the entire pencil of rays into one of the eye-piece lenses, the remaining rays passing to the other eye-piece.

6. The combination with a telescope comprising an objective lens and two separate eye-piece lenses, of means for forming images at both eye-pieces comprising a prism extending across the pencil of rays from the objective lens having coacting reflecting surfaces for directing rays into the eye-piece lenses of one of said surfaces, being covered in places to provide alternately separated clear spaces and reflecting spots, the former permitting some of the rays to pass directly to one of the eye-piece lenses and the latter reflecting the remaining rays to the other eye-piece lens.

7. The combination with a telescope having an objective lens and two ocular lenses, of a prism intercepting the entire pencil of rays from the objective lens having coacting reflecting surfaces, one of which is provided with alternately spaced clear and covered portions, the former permitting some of the rays to pass through the prism and the latter reflecting the remaining rays, and a second prism coöperating with the clear portion of said surface to control the direction of the rays emitted therefrom.

8. In a telescope, the combination with an objective lens, a primary ocular located in alinement with the optical axis thereof, and a secondary ocular arranged at an angle to said axis, of a prism disposed in the axis of the telescope and intercepting the entire pencil of rays having two coacting surfaces for directing rays into the secondary ocular, one of said surfaces being provided with spaced clear and covered portions, and a second prism receiving the rays passing through the clear portions of said surface and directing them into the primary ocular.

FREDERICK B. SAEGMÜLLER.

Witnesses:
WILLIAM G. WOODWORTH,
DANIEL M. SMITH.